United States Patent [19]

Christiansen et al.

[11] Patent Number: 5,759,936

[45] Date of Patent: Jun. 2, 1998

[54] LANTHANIDE CERAMIC MATERIAL

[75] Inventors: Niels Christiansen, Gentofte; Jorgen G. Larsen, Soborg, both of Denmark

[73] Assignee: Haldor Topsoe AS, Copenhagen, Denmark

[21] Appl. No.: 794,317

[22] Filed: Feb. 3, 1997

[51] Int. Cl.$^6$ .................................................. C04B 35/50
[52] U.S. Cl. .......................... 501/152; 501/134; 501/135; 429/30; 429/33
[58] Field of Search ................ 429/30, 33; 501/134, 501/135, 152

[56] References Cited

U.S. PATENT DOCUMENTS

| | | | |
|---|---|---|---|
| 4,562,124 | 12/1985 | Ruka | 501/152 |
| 4,851,303 | 7/1989 | Madou et al. | 429/33 |
| 4,948,680 | 8/1990 | Madou et al. | 501/152 |
| 5,001,021 | 3/1991 | Maricle et al. | 429/13 |
| 5,411,767 | 5/1995 | Soma et al. | 429/31 |
| 5,489,483 | 2/1996 | Soma et al. | 429/30 |
| 5,534,468 | 7/1996 | Stephenson | 501/152 |
| 5,604,048 | 2/1997 | Nishihara et al. | 501/152 |
| 5,639,572 | 6/1997 | Mori et al. | 501/152 |

*Primary Examiner*—Anthony Green
*Attorney, Agent, or Firm*—Ostrolenk, Faber, Gerb & Soffen, LLP

[57] ABSTRACT

A lanthanide oxide ceramic material having the general formula:

$$La_a Ln_b M'_c M''_d O_{3-\delta},$$

wherein

Ln is a combination of Ce, Pr and Nd;

M' is at least one alkaline earth metal;

M" is at least one metal selected from the group consisting of Co, Fe, Ni, Zn, Cu, Mn, Al, V, Ir, Mo, W, Pd, Pt, Mg, Ru, Rh, Cr and Zr; and $0 \leq a \leq 1; 0.01 < b \leq 1;$ $0 \leq c \leq 0.6; 0 \leq d \leq 1;$ and $-1 < \delta < +1$

8 Claims, No Drawings

LANTHANIDE CERAMIC MATERIAL

FIELD OF INVENTION

The present invention concerns a material based on a lanthanide metal containing complex mixed oxide with functional electrical or catalytic properties exhibiting improved commercial and technical performance.

BACKGROUND OF THE INVENTION

Classical ceramic materials for solid oxide components, a variety of catalysts, electrical heating elements and other electronic ceramics are based on mixed oxides containing lanthanide elements such as perovskites having the general formula $ABO_3$. In this formula the symbol A represents a single lanthanide element and in some cases smaller amounts of alkaline-earth elements. The symbol B represents a metal ion with an ionic radius smaller than the A cation. Changing the chemical composition makes it possible to control a variety of technologically important properties such as electronic conductivity, ionic conductivity, heat conductivity, thermal expansion, catalytic properties, chemical stability and high temperature stability. However, the high prices for pure lanthanide materials are prohibitive for a more widespread commercialization. Furthermore, the pure mixed oxides typically used may be very refractory and very difficult to sinter into dense ceramic components.

DETAILED DESCRIPTION OF THE INVENTION

This invention provides a novel lanthanide based complex oxide having an electrical conductivity at a high temperature, wherein a portion of the metal La in the general chemical formula is replaced by the metals Ce, Pr and Nd in amounts above 1%. This new material makes it possible to use partly refined lanthanum raw material, often named "lanthanum concentrates" instead of more expensive highly refined lanthanum chemicals. The presence of the other lanthanides in the complex mixed oxide, in addition to traces of other impurities originating from the partly refined lanthanum raw material enhances the sinter activity of the mixed oxide making densification easier. Furthermore, the lanthanum deficiency in the mixed oxide induced by partly or completely replacing lanthanum with other lanthanides reduces the detrimental reaction between lanthanum and other components adjacent to the mixed oxide material. This is a well known problem when using pure lanthanum ceramic materials as cell material in Solid Oxide Fuel Cells.

In accordance with the present invention, there is provided a lanthanide oxide ceramic material having the general formula: $La_aLn_bM'_cM''_dO_{3-\delta}$, wherein Ln is a combination of Ce, Pr and Nd; M' is at least one alkaline earth metal; M" is at least one metal selected from the group consisting of Co, Fe, Ni, Zn, Cu, Mn, Al, V, Ir, Mo, W, Pd, Pt, Mg, Ru, Rh, Cr, and Zr; and $0 \leq a \leq 1$; $0.01 < b \leq 1$; $0 \leq c \leq 0.6$; $0 \leq d \leq 1$; and $\delta$ is a defect amount, i.e., a value necessary to correct any mismatch in valances. Preferably, Ln is about 0.01 to 50 atomic per cent of each of Ce, Pr and Nd, a is at least 0.1, and each of c and d are greater than 0, and more preferably, at least 0.1.

Changes in properties introduced by the other lanthanide elements when compared with mixed oxides without these other lanthanides may be compensated for by doping with other elements. For instance in the case of lanthanum based perovskites the A-site may be doped with alkaline earth elements such as Mg, Ca, Sr or Ba and the B-site may be doped with metal elements or transition elements.

The classical cathode material for Solid Oxide Fuel cells (SOFC) is the perovskite lanthanum strontium manganate (LSM). This material is traditionally synthesized by solid state reaction of pure oxides, carbonates or hydroxides. Other well-known synthesis methods start with mixtures of solutions of pure salts of the actual elements. The material according to this invention may be synthesized by mixing the partly refined mixed lanthanide raw powder with strontium carbonate and manganese oxide followed by calcination.

Another synthesis method according to this invention is to dissolve the partly refined mixed lanthanide raw powder in an acid such as nitric acid followed by addition of salt solutions of strontium and manganese. This mixed salt solution may be pyrolysed to produce the desired lanthanide based material.

Lanthanum chromites represent the state-of-the-art materials for use as current interconnections in SOFCs. This material has an $ABO_3$-type perovskite structure and alkaline-earth cations (like Mg, Ca, Sr or Ba) are often substituted for a fraction of La on the A-lattice site greatly enhancing the electrical conductivity. Lanthanum strontium chromites have become quite popular for SOFC interconnections due to an excellent combination of properties.

According to this invention lanthanide ceramic materials may be prepared as described above and in the following Examples.

EXAMPLE 1

Commercial Lanthanum Concentrate containing 40% $La_2O_3$, 4% $CeO_2$, 5.5% $Pr_6O_{11}$ and 13.5% $Nd_2O_3$ plus 1% other lanthanides is dissolved in 65% $HNO_3$. This solution is combined with a 1M solution of $Sr(NO_3)_2$ and $Mn(NO_3)_3$ in quantities according to the chemical formula:

$$La_{0.54}Ce_{0.05}Pr_{0.07}Nd_{0.18}Sr_{0.15}MnO_3$$

The resulting mixed salt solution is added glucose in a molar ratio of 1:1 with respect to the total metal cation content and pyrolysed in a 600° C. hot rotary furnace resulting in a single phase complex perovskite powder. After calcination at 900° C. followed by ball milling the powder is suitable for traditional ceramic processing such as tape casting, screen printing or dry pressing. The X-ray diffraction spectrum of the calcined powder shows the characteristic lines for a single phase perovskite material.

EXAMPLE 2

Commercial Lanthanum Concentrate containing 40% $La_2O_3$, 4% $CeO_2$, 5.5% $Pr_6O_{11}$ and 13.5% $Nd_2O_3$ plus 1% other lanthanides is mixed with $Sr(CO_3)_2$ and $Cr_2O_3$ in amounts according to the chemical formula:

$$La_{0.54}Ce_{0.05}Pr_{0.07}Nd_{0.18}Sr_{0.15}CrO_3$$

The powder mixture is calcined at 900° C. followed by spray-drying. The spray-dried powder is shaped by dry pressing followed by sintering in air, argon or nitrogen at temperatures between 1400° C. and 1700° C. The X-ray diffraction spectrum of the calcined powder shows the characteristic lines for a single phase perovsite material.

We claim:

1. In a method of preparing a lanthanide oxide ceramic material which comprises combining a source of lanthanide elements, a source of an alkaline earth metal and a source of a metal selected from the group consisting of Co, Fe, Ni, Zn, Cu, Mn, Al, V, Ir, Mo, W, Pd, Pt, Mg, Ru, Rh, Cr and Zr and forming the ceramic material from said sources, the improvement which comprises employing lanthanum concentrate as the source of the lanthanide elements, said lanthanum concentrate containing 40% $LaO_3$, 4% $CeO_2$, 5.5% $Pr_6O_{11}$ and 13.5% $Na_2O_3$.

2. The method of claim 1, wherein the source of lanthanide elements contain about 0.01 to 50 atomic per cent of each of Ce, Pr and Nd based on the total amount of lanthanide elements.

3. A product produced by the process of claim 1.

4. A product produced by the process of claim 2.

5. The ceramic material having the formula $La_{0.54}Ce_{0.05}Pr_{0.07}Nd_{0.18}Sr_{0.15}MnO_3$.

6. The ceramic material having the formula $La_{0.54}Ce_{0.05}Pr_{0.07}Nd_{0.18}Sr_{0.15}CrO_3$.

7. In a fuel cell having a ceramic material therein, the improvement which comprises a ceramic material comprising the lanthanide oxide ceramic material of claim 5.

8. In a fuel cell having a ceramic material therein, the improvement which comprises a ceramic material comprising the lanthanide oxide ceramic material of claim 6.

* * * * *